Nov. 4, 1930.                C. L. KENNEDY                 1,780,881
                              INDUCTION MOTOR
                           Filed Oct. 15, 1926

Witness
Frederick S. Greenleaf.

Inventor
Carlson L. Kennedy
by his attorneys
Van Everen Fish Hildreth & Cary

Patented Nov. 4, 1930

1,780,881

UNITED STATES PATENT OFFICE

CARLTON L. KENNEDY, OF BRAINTREE, MASSACHUSETTS, ASSIGNOR TO THE HOLTZER-CABOT ELECTRIC COMPANY, OF ROXBURY, MASSACHUSETTS, A CORPORATION OF MASSACHUSETTS

INDUCTION MOTOR

Application filed October 15, 1926. Serial No. 141,756.

The present invention relates to induction motors, and more particularly to single phase induction motors employing a condenser circuit of the general type disclosed in the co-pending application of Kennedy, Serial No. 141,755, filed of even date herewith.

The co-pending application discloses a form of induction motor having a line stator winding adapted to be connected directly to the supply, in combination with a parallel circuit including an auxiliary stator winding and a condenser in order that currents displaced both in time and space from the current in the line windings may be caused to flow therethrough. The auxiliary winding has several times as many turns as the line winding, and the condenser is of such a magnitude that the terminal voltage across the auxiliary winding under running conditions is approximately the line voltage multiplied by the turns ratio of the two stator windings. In order that a leading current may be taken under all conditions in the condenser circuit the capacity of the condenser is somewhat less than that required for resonance, that is to say, the capacity reactance of the condenser circuit is greater than the inductive reactance. The motor operates satisfactorily under running conditions, but possesses a low starting torque. This follows from the fact that the apparent reactance of the auxiliary stator winding at starting is much less than the apparent reactance when running.

The object of the present invention is to provide a condenser induction motor having a high starting torque. To this end the invention consists of an induction motor hereinafter described and particularly defined in the claims.

Figure 1:
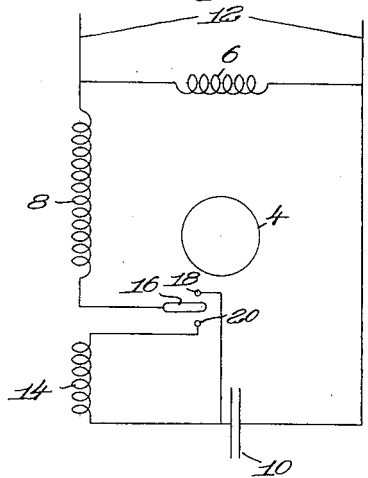
Figure 2:
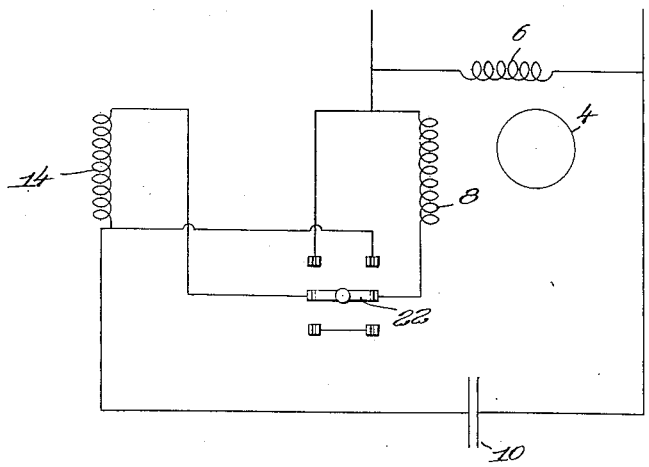

In the accompanying drawings, Fig. 1 is a diagram of an induction motor embodying the features of the present invention; and Fig. 2 is a diagram of a modified circuit arrangement of the induction motor which contributes to an increased efficiency.

In the illustrated embodiment of the invention, the starting torque is improved by increasing the inductive reactance of the condenser circuit at starting. It has been found that the apparent reactance of the auxiliary winding when running may be several times the apparent reactance at starting (the term "apparent reactance" being considered as the ratio of terminal voltage across the auxiliary winding to the current flowing in the winding). The greater apparent reactance under running conditions is due to the increased voltage in the auxiliary winding which follows from the voltage induced by the transformer action through the rotation of the rotor. In the construction of the Kennedy application above referred to, the condenser circuit has an excess of capacity reactance over that required for resonance, that is to say, the condenser is smaller than would be necessary to produce resonance conditions in the circuit, in order that a leading current may be caused to pass through the auxiliary stator winding. It will be seen, therefore, that at starting when the apparent inductive reactance is small, the circuit is far from a resonant condition, and a very small current will be passed. This condenser current is too small to afford a high starting torque unless a high resistance rotor is employed. According to the present invention the inductive reactance of the circuit at starting is increased to such a value that resonance is approached in order that a sufficient current out of phase to the main stator current may be obtained to afford a good starting torque.

In Fig. 1 the squirrel cage rotor of an induction motor is indicated at 4, the main or line stator winding at 6 and an auxiliary stator winding at 8. Under running conditions the auxiliary winding 8 in conjunction with a fixed condenser 10 is adapted to be placed in parallel with the line winding 6 which is connected to a source indicated at 12. As in the Kennedy application above referred to, the auxiliary winding 8 has a greater number of turns than the line winding, preferably two to five times as many, and the condenser 10 is of such a value that under running conditions the terminal voltage across the winding 8 will approximately equal the voltage across the line winding 6 multiplied by the ratio of turns of the two windings. Under these conditions, maximum efficiency and most desirable power factor conditions will obtain, owing to the fact that both windings are receiving approximately equal amounts of energy.

The starting torque of the motor being low when the condenser circuit includes only the winding 8 and the condenser 10, the present invention provides an additional winding 14 also displaced in space phase from the winding 6 and adapted to be placed in series with the auxiliary winding 8 to increase the inductive reactance of the condenser circuit during starting. The connections of the windings 8 and 14 are controlled by a switch 16 having contacts 18 and 20, the former being employed under running conditions to include only the winding 8 in circuit, and the latter being employed at starting to include both of the windings 8 and 14 in series with the condenser 10. The winding 14 is designed so that in conjunction with the winding 8 its apparent reactance at starting will be approximately equal to and will, therefore, balance the capacity reactance of the condenser 10, thus permitting a heavy current to flow through the condenser circuit. Assuming that the condition is one of exact resonance, there will flow in the condenser circuit a current which is in phase with the impressed voltage, and which will be of a magnitude determined only by the resistance of the condenser circuit. The current taken by the winding 6 will be a lagging current. The two currents will, therefore, be displaced both in space and time relation from each other, and accordingly will produce a high torque.

The winding 14 of the above construction is employed only during starting. In order to increase the efficiency of the system, the modification shown in Fig. 2 comprises an arrangement whereby both windings of the condenser circuit are employed at all times, being connected in parallel for running conditions, and in series for starting. This construction is feasible when the apparent reactance of each winding under running conditions is from three to five times the apparent reactance at starting, and while it may not produce an exactly resonant condition at starting it provides a sufficient approximation to resonance so that ample current for a satisfactory starting torque is caused to flow through the condenser circuit. The rotor 4, line winding 6, auxiliary winding 8, condenser 10 and starting winding 14 are as in the previously described construction. A double throw switch 22 is connected in the condenser circuit for selective arrangement of the windings 8 and 14 either in series or in parallel. When the switch is in its uppermost position the windings are connected in parallel, and when in its lower position the windings are in series. The windings are to be placed in series for starting, at which time circuit conditions approaching resonance occur, and a high starting current accordingly flows in the auxiliary winding. When the motor is brought up to speed, the switch is thrown so as to place the windings in parallel. The parallel arrangement of the windings reduces the resistance to one-half the resistance of a single winding, thereby contributing to the efficiency of the motor. In this arrangement it will be obvious that the windings 8 and 14 should be of equal size in order that no circulatory currents may be caused to flow therein by any differences of induced potentials across the terminals when the windings are in parallel.

By the present invention a high starting torque may be obtained in a single phase motor. The arrangement is superior to the usual split phase mode of starting in that a higher current may be caused to flow in the auxiliary winding, and also because the phase displacement between the currents in the line winding and the auxiliary winding may be made considerably greater. The starting current may be made correspondingly lower.

It will be understood that although the preferred form of the invention has been described herein, the invention is not limited to the construction described in the co-pending application wherein the auxiliary winding has several times as many turns as the main winding, or to the use of increased inductance sufficient to actually produce resonance at starting so long as resonance is more nearly approached than by the use of the running windings alone.

Having thus described the invention, what is claimed is:

1. An induction motor having, in combination, a rotor, a stator having a line winding, a condenser circuit in parallel with the line winding and including a condenser and an auxiliary stator winding displaced from the line winding, and means for placing an additional stator winding in series with the auxiliary winding to make the condenser circuit approach resonance at starting.

2. An induction motor having, in combination, a rotor, a stator having a line winding and a plurality of auxiliary windings displaced from the line winding, a condenser, circuit connections including the condenser and an auxilary winding under running conditions, and means for placing a plurality of auxiliary windings in series to increase the inductive reactance of the condenser circuit at starting.

3. An induction motor having, in combination, a rotor, a stator having a line winding and a plurality of similar auxiliary windings, a condenser circuit in parallel with the line winding and including a condenser and the auxiliary windings, and means for selectively placing the auxiliary windings in parallel with each other under running conditions and in series for starting.

4. An induction motor having, in combination, a rotor, a stator having a line winding and an auxiliary winding displaced from the line winding, a condenser circuit including the auxiliary winding and a condenser connected in parallel with the line winding and maintained continuously energized under running conditions, the reactance of the condenser being sufficient to draw a leading current in the condenser circuit under running conditions, and means for placing additional inductive reactance in series with the condenser in the condenser circuit to approach resonance at starting.

In testimony whereof I have signed my name to this specification.

CARLTON L. KENNEDY.